US008675022B2

(12) United States Patent
Liang et al.

(10) Patent No.: US 8,675,022 B2
(45) Date of Patent: Mar. 18, 2014

(54) JOY-STICK LIKE GRAPHICAL USER INTERFACE TO ADJUST 3D CROSS SECTIONAL PLANE IN 3D VOLUME

(75) Inventors: Cheng-Chung Liang, West Windsor, NJ (US); Guo-Qing Wei, Plainsboro, NJ (US); Li Fan, Belle Mead, NJ (US)

(73) Assignee: EDDA Technology, Inc., Princeton, NJ (US)

( * ) Notice: Subject to any disclaimer, the term of this patent is extended or adjusted under 35 U.S.C. 154(b) by 1426 days.

(21) Appl. No.: 11/798,783

(22) Filed: May 16, 2007

(65) Prior Publication Data

US 2007/0291000 A1 Dec. 20, 2007

Related U.S. Application Data

(60) Provisional application No. 60/800,418, filed on May 16, 2006.

(51) Int. Cl.
*G06F 3/033* (2013.01)
*G06F 3/048* (2013.01)

(52) U.S. Cl.
USPC .......................................... 345/653; 345/679

(58) Field of Classification Search
CPC .................................................. G06F 3/04815
USPC ........... 345/632, 633, 653, 664, 679; 715/849
See application file for complete search history.

(56) References Cited

U.S. PATENT DOCUMENTS

| | | | |
|---|---|---|---|
| 5,371,778 A * | 12/1994 | Yanof et al. ................... | 345/427 |
| 5,861,889 A | 1/1999 | Wallace et al. | |
| 6,046,749 A | 4/2000 | Andersson | |
| 6,295,069 B1 * | 9/2001 | Shirur ............................ | 345/420 |
| 6,448,964 B1 | 9/2002 | Isaacs et al. | |
| 6,515,687 B1 * | 2/2003 | Wynn et al. .................... | 715/840 |
| 6,515,689 B1 * | 2/2003 | Terashima ..................... | 715/856 |
| 7,315,304 B2 * | 1/2008 | Liang et al. .................... | 345/426 |
| 2005/0251038 A1 * | 11/2005 | Liang et al. .................... | 600/437 |

FOREIGN PATENT DOCUMENTS

| | | |
|---|---|---|
| WO | WO 95/11480 | 4/1995 |
| WO | WO 2005/104954 A2 | 11/2005 |
| WO | WO 2005/104954 A3 | 11/2005 |
| WO | WO/2007/136627 A2 * | 11/2007 |

OTHER PUBLICATIONS

International Preliminary Report on Patentability and Written Opinion of the International Searching Authority, issued in corresponding International Patent Application No. PCT/US2007/011657, mailed on Apr. 3, 2008.
"Ray Tracing", Wikipedia The Free Encyclopedia http://web.archive.org/web/20060313161302/http://en.wikipedia.org/wiki/Ray_tracing, retrieved Mar. 17, 2008.

* cited by examiner

*Primary Examiner* — Jeffery A Brier
(74) *Attorney, Agent, or Firm* — Pillsbury Winthrop Shaw Pittman LLP

(57) ABSTRACT

Methods for a joy-stick graphical control in 3D space are disclosed. 3D data are rendered with a certain orientation in a 3D rendering space within a region of a 2D screen. One or more cross sectional views of the 3D data are rendered in the 3D rendering space where the cross sectional views are derived based on corresponding one or more 3D planes cutting through the 3D data at a 3D location. On one 3D plane, a joy-stick control is rendered in the 3D space at a pose determined based on the joy stick.

38 Claims, 4 Drawing Sheets

401

JOY-STICK LIKE GRAPHICAL USER INTERFACE TO ADJUST 3D CROSS SECTIONAL PLANE IN 3D VOLUME

CROSS REFERENCE TO RELATED APPLICATION

This application claims priority under 35 U.S.C. §119 from Provisional Patent Application No. 60/800,418, filed on May 16, 2006. The entire subject matter of the application is incorporated herein by reference.

BACKGROUND

1. Technical Field

The present teaching relates to methods for data processing. More specifically, the present teaching relates to methods for 3D data processing, visualization, and manipulation.

2. Description of Related Art

To explore dense 3D data set such as 3D volumes from medical scanning devices like CT or MR, cross sectional slices are usually used. In most of the nowadays applications, slices aligned with coordinate axes are generated as three orthogonal views to facilitate exploring the 3D volume. However, sometimes the slices along these angles may not reveal features users expect to see. in these situations, oblique or double-oblique angle slices are then needed. However, how to allow a user to effectively determine the location of the oblique or double-oblique slice is a non-trivial task.

To determine the location of an oblique or double-oblique slice is to determine the orientation and position of a plane in a 3D space. There are six degree of freedom (DOF) associated with an orientation and position of a plane. Some of the 3D input devices can provide information specifying six degrees of freedom instantly. However, in the current computer environment, the keyboard, mouse and two-dimensional (2D) screen may still be the most ubiquitous input and output devices. The mouse used in those environments is a two DOF device. How can one utilize such a device to accomplish a six DOF action is a challenge. Some applications implement each degree of freedom as a slider control. User may adjust each slider to change the value of each degree of freedom. However, this approach is very non-intuitive, time consuming, and difficult to use. The other approach is to provide three orthogonal axis-aligned views and the intersection lines of the 3D plane with these three orthogonal planes. Users may drag or rotate these intersection lines to define the new orientation and position of the 3D plane. Since a user can see the underlying image in each view, it is also easier for user to move the plane to the desired location. However, this approach still requires that a user imagine the spatial relationship of the plane with the orthogonal planes which is not straightforward and it is hard to define a double-oblique plane. Due to drawbacks in the aforementioned approaches, a more direct and intuitive solution is needed.

SUMMARY

The present teaching discloses a joy-stick like graphical user interface control in a perceptually 3D scene that allows a user to change the orientation and position of a 3D plane directly in the perceptually 3D scene. This control stick comprises a plurality of control parts, including a stick tip, a stick body, and a stick base. The stick tip may be used to change the orientation of the 3D plane, the stick body is used to shift the location of the 3D plane along a certain direction of the 3D plane, and the stick base is used to change a point on the 3D plane that defines a base of rotation of the 3D plane.

A control part may be active or inactive. An active control part may be associated with a visual indication such as being highlighted when mouse is moved over the control part to facilitate a user to choose to operate a control part that is currently active. Manipulation of a control part yields a control action that causes changes in data processing. An operation performed using a control part A control action may be designed to follow the movement of the mouse so that a user has full control of the action. With this intuitive control and supported views, user may adjust the 3D plane in a more effective way.

DETAILED DESCRIPTION

The present teaching describes a What-You-See-Is-What-You-Got (WYSIWYG) approach for 3D data manipulation and processing control. With this approach, a user can see 3D data and a joy-stick control and operation thereof in a 3D rendering space directly. This approach eliminates the need for a user to mentally reconstruct a 3D picture. In accordance with the present teaching, a 2D display screen is used to render and manipulate 3D data. On the 2D display screen, at least a portion of the 2D display screen is used for 3D rendering. This portion may be called a 3D rendering space. In the 3D rendering space, 3D data may be rendered in a certain orientation in accordance with a 3D coordinate system. In addition to the 3D rendering of the 3D data as a volume, there are one or more 3D planes also rendered in the 3D rendering space. Each of the 3D planes cuts through the 3D data volume in a direction along the surface of the plane. These cutting planes may intersect with one another.

Figure 1:
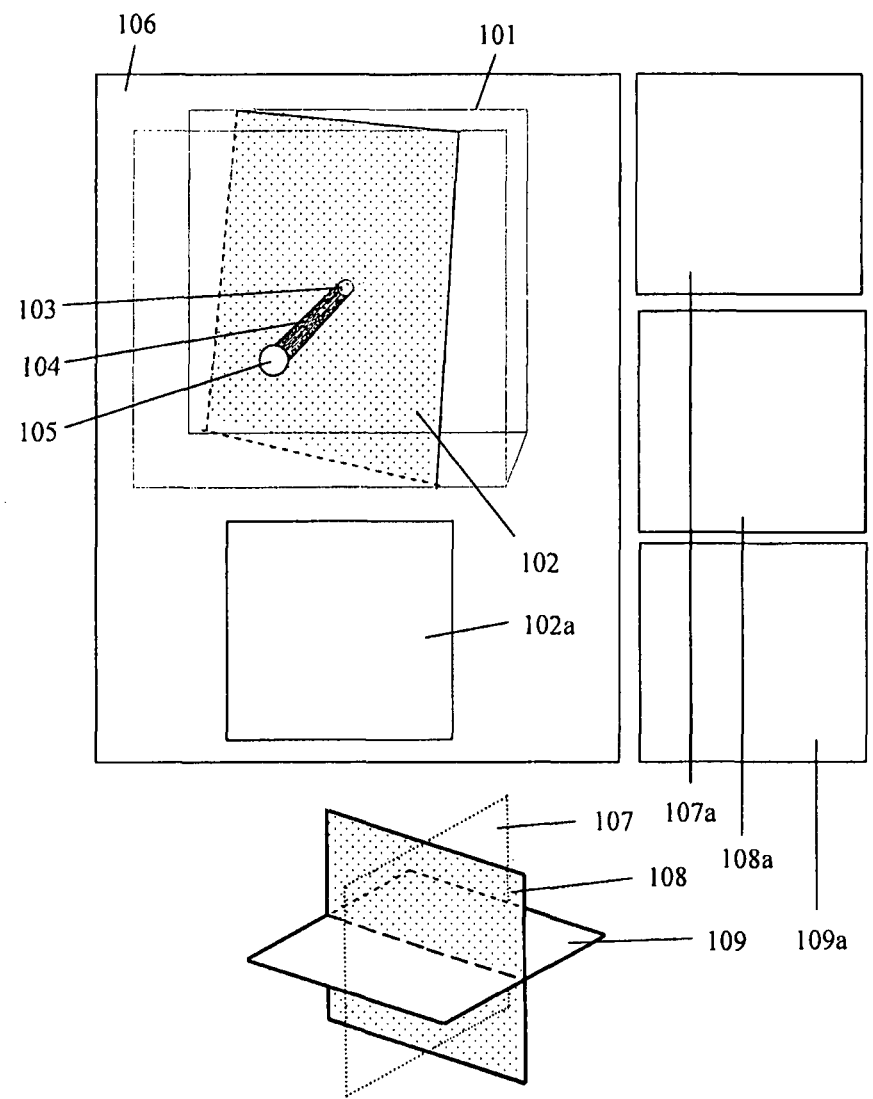
FIG. 1 shows an exemplary display screen arrangement with a joy-stick control, according to an embodiment of the present teaching.

FIG. 1 illustrates an exemplary display arrangement 100 of different regions on a 2D display screen according to an embodiment of the present teaching. FIG. 1 shows a display space 106 and a plurality of viewing areas 107a, 108a, and 109a in which a 2D images may be displayed. In the display space 106, 3D data 101 is rendered in a 3D rendering space where a 3D plane 102 is visualized with the rendering of the 3D data and is oriented or cut through the all data with a certain, angle in the 3D volume. In some embodiments, there may be additional 3D planes, similar to plane 102, each of which has its own 3D pose and may slice through the 3D data in accordance with an angle in the 3D space. When there are more than one cutting planes, they may have a certain spatial relationship. For example, such cutting planes may form straight angles with each other.

In the exemplary display arrangement 100, there may also be one or more viewing areas. For example, there may be three viewing areas 107a, 108a, 109a, which may be designed to display cross sectional views obtained along a certain dimension or axis of the 3D data rendered in the 3D rendering space 106. For example, the viewing area 107 may be used to display 2D cross sectional views or slices of the 3D data along X axis. The viewing area 108 may be used to display 2D cross sectional views or slices of the 3D data along Y axis. The viewing area 109 may be used to display 2D cross sectional views or slices of the 3D data along Z axis.

When a volume (or volumes) is rendered in a space in which a cutting plane slices through, the corresponding cross sectional slice may also be displayed or projected on the cutting plane in the 3D rendering space directly. In addition, the cross sectional view may also be displayed as a 2D image in the space where the 3D rendering is displayed. For example, in the display space 106, the 2D cross sectional view 102a corresponding to the 3D plane 102 is displayed as a 2D image in the 3D rendering space.

When there are more than one 3D planes, such planes may have a certain spatial relationship. For instance, three planes may be orthogonal to each other. They may or may not align with the three (X, Y, and Z) axes of the 3D space. The entire 3D rendering space 101 may be rotated via a mouse-dragging operation. Multiple planes slicing through the 3D data may intersect. Such 3D planes may be grouped together so that when one moves, others also move accordingly. Such 3D planes may also be independent so that changes in one plane may not have an effect on others.

In FIG. 1, a joy-stick is rendered as attaching to a 3D cutting plane, e.g., the 3D plane 102. The joy-stick has multiple part, including a stick base 103, a stick body 104, and a stick tip 105. The stick base 103 is the part attached to a point on the 3D plane 102. The joy-stick is rendered within the confinement of the space in which the 3D data volume is rendered. The joy-stick may be rendered in a fashion so that its 3D pose has a certain spatial relationship with respect to the 3D plane 102. For example, the joy stick may be rendered so that the stick body 104 forms a certain angle with respect to the surface normal of the 3D plane 102. One example is to be in alignment with the surface normal of the plane 102. As illustrated, the stick base 103 is where the joy stick is attached to the 3D plane. In addition, the stick base 103 serves as a point with respect to which the joy stick can be rotated via a movement of the stick tip.

A user may manipulate the 3D plane 102 via the joy stick. This allows the user to visualize different cross sectional views of the 3D data in a flexible manner. For example, a user may change the orientation of the 3D plane 102 by grabbing the stick tip 105 of the joy-stick to rotate around the base point of the stick. In accordance with the present teaching, when the joy stick is rotated in this manner, the orientation of the plane 102 changes accordingly. In addition, the user may slide up and down along the stick body. When the slide position along the stick body changes, the 3D position of the plane 102 may change accordingly. Furthermore, the user may grab the stick base 103 of the joy-stick and move around the surface of the plane 102. This may cause a change in the position at which the joy stick is attached to the plane.

In accordance with the present teaching, the joy stick may be rendered as an object which has rigid parts that are connected in a certain physical configuration. When one part of the joy stick changes, other parts may change based on the relationship among different parts. For example, if the stick base is moved, the other parts of the joy stick move accordingly. However, depending on the configuration of different parts, in certain situations, movement of one part may not cause other parts to move. For example, when the stick tip is moved or rotated, the stick base does not move.

When the pose of the plane 102 is changed, including orientation or 3D location, the rendering of the plane 102 is updated accordingly. For instance, the cross sectional view of the plane 102 may be dynamically updated. In addition, the 2D image display in region 102a of the cross section sliced by the plane 102 may also be updated on the fly. Furthermore, when there are more than one 3D cutting planes in the 3D rendering space, these planes may form a certain spatial relationship. In some embodiments, such spatial relationship among different planes may be dynamically maintained, when the pose of one of the planes changes. In this case, the rendering of other planes may also be updated dynamically. For example, if there are three planes orthogonal to each other, if one changes the orientation, the orientations of other planes also change in order to maintain the orthogonality. In this case, the joy stick attached to one plane may impact other planes so that the control over one plane via a joy stick can be extended to other planes. In some embodiments, even though there are multiple cutting planes in the 3D space and they initially have a certain spatial relationship, the changes made to one of such planes via a joy stick attaching to that plane may not have impact on others. In some embodiments, each such cutting plane may have its own control joy stick and the scope of control performed through each such joy stick may be applied to the plane to which the joy stick is attached.

Figure 2:
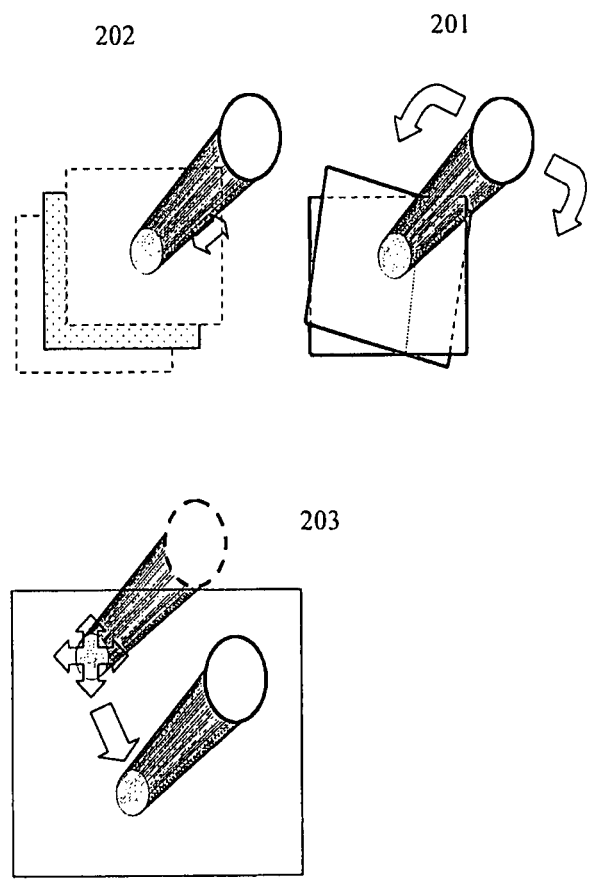
FIG. 2 illustrates exemplary control operation using a joy-stick control, according to an embodiment of the present teaching.

FIG. 2 illustrate an exemplary operation of the joy stick, according to an embodiment of the present teaching. There are three parts of the joy stick that can be manipulated to perform certain control operations. For example, a user may grab the stick tip and rotate around the stick base point, as shown in 201. As described herein, when the stick tip rotates, the orientation of the plane to which the joy stick is attached (e.g., 102) also changes. A grab operation may be performed via a mouse operation such as holding down or one or more clicks. A user may also use a mouse to slide along the stick body, as shown in 202. A sliding operation, either up or down, may cause accordingly the movement of the position of the plane 102, as illustrated in 202. A user may also grab the stick base via a mouse operation and move the stick base along the plane 102 to change the position of the joy stick on the plane. This is illustrated in 203. The joy stick may be implemented as a rigid object so that when the base of the stick moves, the rest of the joy stick such as stick body and stick tip also move accordingly.

In operation, the mouse is operable in a 2D space (the 2D screen) but its effect is 3D control over a 3D plane in a 3D rendering space. The stick tip, the stick body, and the stick base may be activated individually and/or separately. For example, in some embodiments, a control part on the joy stick may be made active whenever the mouse is within a certain distance or overlap with the part. In this way, the part that is closest to the mouse is active so that it is more convenient for a user to operate to control via a particular part of the joy stick. In addition, the active control part of the joy stick may be made visual visible as to its active status. For instance, the active part may be highlighted whenever the mouse is close by, so that a user can more readily see which part of the joy stick is currently active.

Figure 4:
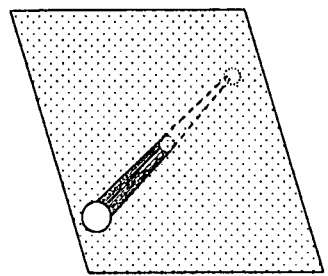
FIG. 4 shows an exemplary use of a joy-stick control that is controllable on both sides of a 3D plane according to an embodiment of the present teaching.

Each control part on the joy stick may have its own operational range. For example, in some embodiments, the operational range of the stick base may be the surface of the 3D plane to which the joy stick is attached. The range to perform a sliding operation along the stick body may be the length of the stick body, which may or may not have a fixed length. The length of the stick body may have a normalized relationship with the thickness of the 3D volume in a direction that is perpendicular to the surface of the 3D plane to which the joy stick is attached. In this way, when a mouse slides up and down along the stick body, each sliding position along the stick body corresponds to a particular depth in that direction. In some embodiment, the length of the stick body may correspond to the portion extended from the stick base along a direction coming out of the 2D display screen. In some embodiments, the stick body may extend from the stick base in two opposite directions, one is in a direction coming out of the screen and another direction going into the screen. This is illustrated in FIG. 4. In this case, the total length of the stick body may have a normalized relation with respect to the thickness of the 3D volume in the direction perpendicular to the surface of the plane to which the joy stick is attached.

Figure 3:
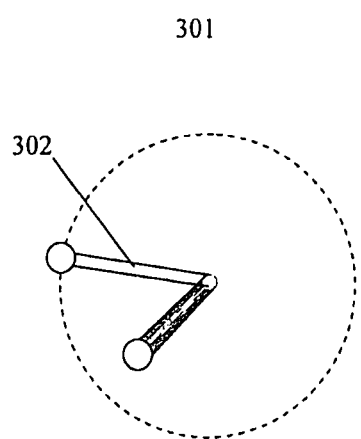
FIG. 3 illustrates an exemplary rotation range of a joy-stick control, according to an embodiment of the present teaching.

Similarly, the stick tip may also have its operational range. In some embodiments, the operational range of the stick tip (e.g., rotation with respect to the stick base) may be within the surface area or a partial surface area of an imaginary sphere. This is illustrated in FIG. 3. Such an imaginary sphere is centered at the stick base and has a radius equal to the length of the stick body. In some embodiments, the operational range of the stick tip may be confined to the visible surface of the sphere, as shown in FIG. 3. In some embodiments, the operational range of the stick tip may be extended to the occluded surface of the sphere, as illustrated in FIG. 4.

When the stick tip is dragged, the stick tip intersects with the imaginary sphere. At each position the stick tip is moved to on the sphere, the orientation of the plane is determined based on the tangent plane at the position of the stick tip. In some embodiments, the orientation of the plane may be parallel to the tangent plane. In some embodiments, the orientation of the plane and the tangent plane may have a certain relationship. In this manner, a user may rotate the plane in a flexible way.

In some embodiments, when the orientation of the plane to which the joy stick is attached changes, the orientations of other orthogonal planes may also change in order to maintain their spatial relationship with each other. For instance, if there are three planes orthogonal to each other, when the orientation of one changes, the orientations of other planes change accordingly so that the orthogonality among three planes is maintained. In some embodiments, a user may have the choice to designate the three viewing areas 107a, 108a, and 109a to display cross sectional views obtained by corresponding cutting planes. In this case, when the orientation of a plane changes, not only the orientations of other planes also change, the corresponding cross sectional views corresponding to each of the planes also change. Therefore, the 2D images displayed in the 2D viewing areas 107a, 108a, and 109a as well as the 2D image displayed in display area 102a may be dynamically updated on the fly while the orientations of the planes undergo changes. In this manner, a user is given a range of flexibility to explore the 3D data.

In some embodiments, when the orientation of the plane to which the joy stick is attached (e.g., 102) changes, the rendering of the joy stick may also be dynamically updated. For instance, the joy stick may be attached to the plane, e.g., 102, in a manner so that the stick body and the surface of the plane forms a certain spatial relationship (e.g., the stick body is parallel to the surface normal of the plane). In this case, whenever the orientation of the plane is changed, the 3D post of the joy stick may need to be changed accordingly in order to maintain the spatial relationship.

As illustrated above, the flexible movement of individual parts of the joy stick allows a user to explore the 3D data in an effective manner. In addition, since the 2D cross sectional view corresponding to a cutting plane is also displayed in the same 3D rendering space, a user does not need to go back and forth between 3D control and 2D control or shift the focal point in order to understand the 3D data. When multiple planes are controlled by the same joy stick and cross sectional views for these planes are designated to be displayed in the viewing areas, this also provide a user a powerful tool to visualize and understand the 3D data. Furthermore, the ability to extend the operations of the stick body and stick tip to the occluded part of the 3D data, as described herein, also enhance a user's capability to effectively explore and manipulate the 3D data.

As discussed, in some embodiments, a movement of a control part of the joy stick, e.g., a rotation of the stick tip, a sliding on the stick body, or a position shifting of the stick base, may be implemented or realized through the use of 2D mouse movements. This makes commodity computers or devices more versatile and provides a cost effective way to enable enhanced capability in 3D data exploration and manipulation. To facilitate mouse enabled joy stick 3D control without relying on virtual track ball (which is not common and more expensive), a mouse position as occurred on a 2D display screen needs to be transformed into a 3D position in a 3D space where the 3D data and the joy stick is visualized.

An enabling aspect that makes 2D-based mouse action capable of controlling a 3D structure relates to a transformation from a 2D screen coordinate (where the mouse is) to a 3D coordinate in 3D scene. Such a conversion may be carried out in the following manner. The transformation may involve a first conversion from a 2D screen coordinate to a 2D canvas coordinate as well as a second conversion from a 2D canvas coordinate to a 3D coordinate. The first conversion may be needed due to different coordinate conventions. A 2D screen coordinate system may have a different raster scan convention than that of a 2D canvas coordinate system. For example, the 2D screen coordinate system may have the top-left corner as its origin while the 2D canvas coordinate system may have the lower-left corner as its origin. In addition, the 2D screen coordinate system may have a different scope than the 2D canvas coordinate system. For instance, the 2D canvas may have a coverage that is only a part of the 2D screen.

When any of the such situations exists, a 2D screen location may need to be converted to a 2D canvas coordinate. Depending on the difference between the 2D screen coordinate system and the 2D canvas coordinate system, a 2D screen coordinate may be horizontally flipped to derive a corresponding 2D canvas coordinate. Alternatively, a 2D screen coordinate may be vertically flipped to derive a corresponding 2D canvas coordinate. In other situations, a 2D screen coordinate may be translated or transformed in terms of a combination of translation and rotation to derive a corresponding 2D canvas coordinate.

A 2D canvas coordinate, represented by (x,y), may then be transformed to a 3D coordinate in a 3D space. In some embodiments, a 3D coordinate corresponding to a 2D canvas coordinate (x,y) may be identified by tracing a shoot ray until intersecting with a 3D relevant surface. The shooting ray may be in a direction as defined by a vector that is constructed using two 3D points, (x,y,0) and (x,y,1), where the "0" and "1" represent the depth dimension and (x,y,0) corresponds to a 3D point closer to the screen and (x,y,1) is a 3D point that is farther away from the screen.

The 3D structure to be intersected may be determined based on which part of the joy stick is currently activated or being manipulated. For example, when the mouse is used to drag and move the stick tip to change the orientation of the plane to which the joy stick is attached, the 3D structure to be intersected is a sphere defined by the joy stick. When the mouse is used to move the stick base, the 3D structure to be intersected is the planar surface of the plane. When the mouse is used to slide along the stick body, the 3D structure to be intersected is the stick body itself. When the underlying 3D structure is known, the ray tracing can be performed along the direction of the shooting ray until it intersects with the 3D structure at interest. The intersection point defines a 3D position in 3D space having a 3D coordinate corresponding to the transformation of the 2D canvas coordinate from which the tracing is initiated.

In some embodiments, such intersection point may be derived analytically. For instance, a 2D canvas point can be transformed into a 3D point on a sphere when the analytical representation of the sphere is known. The relationship between a 3D scene and 2D screen is analogous to viewing a 3D world through a camera. Assuming there is a transformation T between a 3D coordinate system to a 2D canvas coordinate system. To identify an intersection point between a shooting ray originated from a 2D canvas coordinate corresponding to a mouse position on a 2D screen and the sphere defined by the joy stick as described herein, assume that the sphere in the 3D space is centered at a known 3D position where the stick base is and has a radius r so that the sphere can be analytically represented by equation $(\overline{P}-\overline{C})^2=r^2$. As described herein, the radius of the sphere 302 may correspond to the length of the stick body of the joy stick. Further assume that the 2D canvas coordinate of the current mouse position is (x, y). A shooting ray can be constructed along a vector in a direction from an in-canvas point (x,y,0) towards an out-of-canvas point (x,y,1).

The two points (x,y,0) and (x,y,1) may then be inverse transformed using the transformation T and normalized to generate normalized 3D coordinates, denoted by P1 and P2, respectively. A transformed directional vector V may then be represented as V=P2−P1. A line extended from P1 along the direction V may intersect with the sphere in two, one, or zero point. When there is no intersection, it means that the mouse is not in control of the stick tip. When there is only one intersecting point, the shooting ray intersects the sphere at a tangent point and the shooting ray is on the tangent plane of the sphere at that intersecting point. When there are two intersecting points, the shoot ray shoots through the sphere.

Denote an intersection point as P3, which can be analytically solved using equation P3=P1+k*V, where k is the distance from P1 to P3. Since P3 intersects the sphere, it also satisfies the sphere equation. Therefore, we have $(\overline{P1}+k\overline{V}-\overline{C})^2=r^2$. To solve this equation for k, there may be no solution, corresponding to the situation of no intersecting point, one solution, corresponding to the situation of having the shooting ray on the tangent plane of the interesting point, or two solutions, corresponding to the situation where the shooting ray cuts through the sphere. When there are two solutions, it is appropriate to select the solution representing an intersecting point closer to P1 or closer to the viewer's eye. If there is no solution, the mouse is not in control of the joy stick and therefore no control part of the joy stick can be moved by the mouse. Consequently, in this case, the mouse has no control over the 3D data and display thereof. To obtain control, the mouse needs to be moved to a different location so that the mouse is over or sufficiently close to a control part of the joy stick.

Similarly, an intersecting point between a shooting ray and a planar surface may also be analytically solved. Such a analytical solution may be applied to identify the 3D coordinate of a mouse location on the plane to which the joy stick is attached. If such identified 3D coordinate coincides with the 3D coordinates of the stick base or sufficiently close, the mouse is in control of the stick base and can be used to move the stick base from one location to another on the plane to which the joy stick is attached.

In the same fashion, an intersecting point between a shooting ray and the stick body may also be analytically solved depending on the analytical representation employed for the stick body. For example, in some embodiments, the stick body may be represented as a cylinder in the 3D space. Then the intersecting point may be derived by solving an equation for a cylinder by substituting the representation of P3 in the equation for the cylinder. In some embodiment, the stick body may also be represented as a 3D line to simplify the solution. In this case, instead of seeking an analytical solution, a point on the shoot ray that has the minimum distance to the 3D line may be identified and examined. An intersecting point may be identified only if the minimum distance is smaller than some threshold.

While the inventions have been described with reference to the certain illustrated embodiments, the words that have been used herein are words of description, rather than words of limitation. Changes may be made, within the purview of the appended claims, without departing from the scope and spirit of the invention in its aspects. Although the inventions have been described herein with reference to particular structures, acts, and materials, the invention is not to be limited to the particulars disclosed, but rather can be embodied in a wide variety of forms, some of which may be quite different from those of the disclosed embodiments, and extends to all equivalent structures, acts, and, materials, such as are within the scope of the appended claims.

We claim:

1. A method implemented on a computing machine having at least one processor, storage, and communication platform, comprising:
    graphically rendering, by the at least one processor, a 3D rendering space in a first region on a display screen;
    graphically rendering, by the at least one processor, 3D data in the 3D rendering space on the display screen, the 3D data being rendered with display of its one or more cross sectional views determined based on one or more planes cutting through the 3D data in the 3D rendering space;
    graphically rendering, by the at least one processor in the 3D rendering space, a joy-stick on the display screen, having a stick base, a stick body, and a stick tip, with respect to a first plane of the one or more planes, where the first plane has a 3D position and a 3D orientation;
    receiving a user input to direct a manipulation of the joy-stick rendered on the display screen; and
    updating, by the at least one processor, the 3D position and the 3D orientation of the first plane in the 3D rendering space on the display screen based on the manipulation of the joy-stick in accordance with the received user input, wherein
    whenever the 3D position or the 3D orientation of the first plane is updated based on the manipulation of the joy-stick, the one or more cross sectional views of the 3D data are dynamically changed therewith.

2. The method of claim 1, wherein the stick base of the joy-stick is rendered with respect to the first plane.

3. The method of claim 1, wherein the stick body is extended from the stick base in a 3D direction so that the stick body and the first plane form a certain angle.

4. The method of claim 3, wherein the stick tip is on an end of the stick body opposite of the stick base along the stick body.

5. The method of claim 1, wherein at least one of the stick base, stick body, and stick tip of the joy-stick is active.

6. The method of claim 5, wherein the active part of the joy-stick is determined based on a location of a mouse operable in a 2D space.

7. The method of claim 6, wherein the active part of the joy-stick changes when the display screen location of the mouse changes.

8. The method of claim 5, wherein the active part is highlighted.

9. The method of claim 5, wherein the active part can be moved graphically in the 3D rendering space.

10. The method of claim 9, wherein a movement of an active part in the 3 D rendering space is achieved by grabbing and/or dragging the active part using a mouse operable in the display screen.

11. The method of claim 9, wherein the joy-stick is rendered as a rigid object so that a movement of one part of the joy-stick causes other parts to move accordingly as a rigid body.

12. The method of claim 1, wherein a movement of the stick base causes a change in a 3D location on the first plane to produce an updated 3D stick base position based on which the joy stick is rendered.

13. The method of claim 12, wherein a movement of the stick base causes a change in rendering the joy-stick in accordance with the updated 3D stick base position.

14. The method of claim 1, wherein a mouse movement along the stick body causes a change of a position of the first plane to produce an updated first plane with an updated 3D location with respect to the 3D data.

15. The method of claim 14, wherein a movement of the stick body causes a change in rendering the joy-stick in accordance with the updated 3D location of the first plane.

16. The method of claim 14, wherein a movement of the stick tip causes the orientations of the one or more planes to change.

17. The method of claim 14, wherein a movement of the stick body causes the positions of the one or more planes to change.

18. The method of claim 12, wherein the updated 3D stick base position is determined through a transformation from a display screen location of a mouse position on the display screen to a 3D coordinate representing the updated 3D stick base position in a 3D coordinate system.

19. The method of claim 18, wherein the transformation comprises:
converting the display screen location to a 2D canvas location; transforming the 2D canvas location to the 3D base position represented as a 3D coordinate in a 3D coordinate system.

20. The method of claim 19, wherein the converting comprises:
determining a first 2D coordinate corresponding to the display screen location in a first 2D coordinate system;
determining a first transformation between the first 2D coordinate system to a second coordinate system associated with a 2D canvas; and
transforming the first 2D coordinate to a second 2D coordinate in the second coordinate system using the first transformation, where the second 2D coordinate represents the 2D canvas location.

21. The method of claim 20, wherein the transformation comprises:
constructing a vector between a first 3D point, represented by a first 3D coordinate, and
a second 3D point, represented by a second 3D coordinate, in the 3D coordinate system;
tracing a shooting ray in a direction along the vector until intersecting with the first plane;
determining a third 3D point as the intersection point with the first plane; and
determining the 3D coordinate of the third 3D point in the 3D coordinate system to represent the updated 3D stick base position.

22. The method of claim 21, wherein
the first 3D coordinate is constructed based on the second 2D coordinate and a first value representing a first depth in 3D coordinate system; and
the second 3D coordinate is constructed based on the second 2D coordinate and a second value representing a second depth in 3D coordinate system, where the second value is larger than the first value and represents a deeper depth into the display screen.

23. The method of claim 1, wherein
the updated 3D orientation of the first plane is determined in accordance with a tangent plane at an intersecting 3D point on the virtual half-sphere in a 3D coordinate system; and
the virtual half-sphere is determined based on a first 3D coordinate representing the 3D position of the stick base and a second 3D coordinate representing the 3D position of the stick tip before the movement.

24. The method of claim 23, wherein the virtual half-sphere has a radius measured as the distance between the stick base and the stick tip in the 3D coordinate system, which can be determined based on the first 3D coordinate and the second 3D coordinate.

25. The method of claim 23, wherein the intersecting 3D point is determined by:
transforming a display screen location of a mouse to a mouse 3D coordinate, where the mouse is operable in the display screen and used to rotate the stick tip in the 3D rendering space;
constructing a vector between the mouse 3D coordinate and a third 3D coordinate;
tracing a shooting ray in a direction along the vector until intersecting the sphere for the first time at the intersecting 3D point.

26. The method of claim 25, wherein the third 3D coordinate has the same coordinate as the mouse 3D coordinate except a value representing the depth of the third 3D coordinate, where the third 3D coordinate has a value representing a deeper depth.

27. The method of claim 25, wherein the intersecting 3D point is solved analytically as P3=P1+k*V, where P1 represents the mouse 3D coordinate, V represents the vector, k represents a distance from P1 to P3, where k can be solved based on an equation $(P1+k*V-C)=r^2$, where C is the 3D stick base position represented by the first 3D coordinate and r represents the radius of the sphere.

28. The method of claim 27, further comprising selecting, when more than one solution satisfy the equation, one of the more than one solution that corresponds to a k representing a distance closer to the mouse 3D coordinate.

29. The method of claim 14, wherein the updated 3D location of the first plane is determined in accordance with a 3D intersecting point that intersects the stick body in a 3D coordinate system and is originated from a first 3D coordinate representing a 3D location of a mouse operable in the display screen and is used to slide along the stock body in the 3D rendering space.

30. The method of claim 29, wherein the 3D intersecting point is determined by:

transforming a display screen location of the mouse to the first 3D coordinate;
constructing a vector between the first 3D coordinate and a second 3D coordinate; and
tracing a shooting ray in a direction along the vector until intersecting with the stick body at the 3D intersecting point.

31. The method of claim 1, wherein the joy-stick has a predetermined operable range in the 3D rendering space.

32. The method of claim 1, wherein the joy-stick is operable on both sides of the first plane.

33. The method of claim 1, further comprising displaying, in the 3D rendering space, a 2D image of a cross sectional view obtained by cutting through the 3D data using the first plane.

34. The method of claim 1, further comprising graphically rendering a second region on the display screen.

35. The method of claim 34, wherein the second region comprises one or more 2D viewing areas corresponding to the one or more planes, respectively.

36. The method of claim 35, wherein each of the viewing areas is used to display one or more 2D cross sectional views obtained by slicing through the 3D data in an orientation determined based on a 3D plane corresponding to the view area.

37. A method implemented on a computing device having at least one processor, storage, and communication platform for medical data processing, comprising:
providing a computerized medical data processing system having one or more 3D data processing tools, wherein the 3D data processing tools are capable of:
graphically rendering, by the at least one processor, a 3D rendering space in a first region on a display screen;
graphically rendering, by the at least one processor, 3D data in the 3D rendering space on the display screen, the 3D data being rendered with display of its one or more cross sectional views determined based on one or more planes cutting through the 3D data in the 3D rendering space;
graphically rendering, by the at least one processor in the 3D rendering space, a joy stick on the display screen, having a stick base, a stick body, and a stick tip, with respect to a first plane of the one or more planes, where the first plane has a 3D position and 3D orientation;
receiving a user input to direct a manipulation of the joy-stick rendered on the display screen; and
updating, by the at least one processor, the 3D position and the 3D orientation of the first plane in the 3D rendering space on the display screen based on the manipulation of the joy-stick in accordance with the received user input, wherein
updating the 3D orientation of the first plane is controlled based on a movement of the stick tip of the joy-stick in a virtual half-sphere, and
whenever the 3D position the 3D orientation of the first plane is updated based on the manipulation of the joy-stick, the one or more cross sectional views of the 3D data are dynamically changed therewith.

38. A method implemented on a computing device having at least one processor, storage, and communication platform for computerized 3D data visualization and manipulation, comprising:
graphically rendering a computerized 3D data visualization and manipulation system having one or more 3D data processing tools, wherein the 3D data processing tools are capable of:
graphically rendering, by the at least one processor, a 3D rendering space in a first region on a display screen;
graphically rendering, by the at least one processor, 3D data in the 3D rendering space on the display screen, the 3D data being rendered with display of its one or more cross sectional views determined based on one or more planes cutting through the 3D data in the 3D rendering space;
graphically rendering, by the at least one processor in the 3D rendering space, a joy-stick on the display screen, having a stick base, a stick body, and a stick tip, with respect to a first plane of the one or more planes that has a 3D position and a 3D orientation;
receiving a user input, via an input device, to direct a manipulation of the joy-stick rendered on the display screen; and
updating, by the at least one processor, the 3D position and the 3D orientation of the first plane in the 3D rendering space on the display screen based on the manipulation of the joy-stick in accordance with the received user input, wherein
updating the 3D orientation of the first plane is controlled based on a movement of the stick tip of the joy-stick in a virtual half-sphere, and
whenever the 3D position or the 3D orientation of the first plane is updated based on the manipulation of the joy-stick, the one or more cross sectional views of the 3D data are dynamically changed therewith.

* * * * *